(12) United States Patent
Zhou et al.

(10) Patent No.: US 12,511,794 B2
(45) Date of Patent: Dec. 30, 2025

(54) METHOD AND APPARATUS FOR GENERATING PAGE

(71) Applicants: Beijing Wodong Tianjun Information Technology Co., Ltd., Beijing (CN); Beijing Jingdong Century Trading Co., Ltd., Beijing (CN)

(72) Inventors: Wuyu Zhou, Beijing (CN); Haoxin Su, Beijing (CN); Yue Zhao, Beijing (CN)

(73) Assignees: Beijing Wodong Tianjun Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 320 days.

(21) Appl. No.: 18/037,634

(22) PCT Filed: Oct. 22, 2021

(86) PCT No.: PCT/CN2021/125722
§ 371 (c)(1),
(2) Date: May 18, 2023

(87) PCT Pub. No.: WO2022/105536
PCT Pub. Date: May 27, 2022

(65) Prior Publication Data
US 2023/0410380 A1 Dec. 21, 2023

(30) Foreign Application Priority Data
Nov. 18, 2020 (CN) .......................... 202011290395.5

(51) Int. Cl.
*G06F 3/048* (2013.01)
*G06F 40/154* (2020.01)
*G06T 11/00* (2006.01)

(52) U.S. Cl.
CPC ............ *G06T 11/00* (2013.01); *G06F 40/154* (2020.01)

(58) Field of Classification Search
CPC ............................... G06T 11/00; G06F 40/154
See application file for complete search history.

(56) References Cited

U.S. PATENT DOCUMENTS 7,630,973 B2 * 12/2009 Black .................... G06F 16/951
707/999.005
9,378,299 B1 * 6/2016 Rashidi ............... G06F 16/9535
(Continued)

FOREIGN PATENT DOCUMENTS

CN        103310736 A     9/2013
CN        108984632 A    12/2018
(Continued)

OTHER PUBLICATIONS

International Search Report for PCT/CN2021/125722, dated Jan. 20, 2022, 2 pgs.

*Primary Examiner* — David Phantana-angkool
(74) *Attorney, Agent, or Firm* — BLANK ROME LLP

(57) ABSTRACT

A method and apparatus for generating a page are provided. The method comprises: obtaining initial color information and size information of a target element in a window of an initial page; based on the initial color information, using a first color transformation strategy to generate simulated color information of the target element; in response to determining that the simulated color information of the target element satisfies a preset condition, on the basis of the initial color information of the target element, using a second color transformation strategy to generate target color information of the target element, the prese condition representing the degree of friendliness of a simulated color to the characteristic population; and redrawing the target ele- (Continued)

ment on the basis of the target color information and size information to obtain a target page.

12 Claims, 8 Drawing Sheets

(56) References Cited

U.S. PATENT DOCUMENTS

| | | | | |
|---|---|---|---|---|
| 11,188,610 | B2* | 11/2021 | Childress | G06F 16/9574 |
| 11,367,150 | B2* | 6/2022 | Lackman | G06N 20/00 |
| 11,551,110 | B2* | 1/2023 | Chen | G06N 5/022 |
| 2004/0212815 | A1 | 10/2004 | Heeman et al. | |
| 2015/0095751 | A1* | 4/2015 | Dou | G06F 16/955 |
| | | | | 715/205 |
| 2015/0220520 | A1* | 8/2015 | Hartmann | G06F 16/319 |
| | | | | 707/742 |
| 2017/0300783 | A1* | 10/2017 | Kumar | G06V 10/7715 |
| 2018/0211333 | A1* | 7/2018 | Lackman | G06N 20/00 |
| 2019/0371315 | A1* | 12/2019 | Newendorp | G10L 15/1815 |
| 2021/0133273 | A1* | 5/2021 | Childress | G06F 9/547 |
| 2023/0410380 | A1* | 12/2023 | Zhou | G06T 11/00 |
| 2024/0037728 | A1* | 2/2024 | Souma | G06T 11/00 |
| 2024/0073219 | A1* | 2/2024 | Maizels | H04L 63/0861 |
| 2025/0139842 | A1* | 5/2025 | Liu | G06T 11/00 |

FOREIGN PATENT DOCUMENTS

| | | | |
|---|---|---|---|
| CN | 111427573 | A | 7/2020 |
| CN | 111796889 | A | 10/2020 |
| CN | 112380475 | A | 2/2021 |

\* cited by examiner

METHOD AND APPARATUS FOR GENERATING PAGE

The present application is a national stage of International Application No. PCT/CN2021/125722, filed on Oct. 22, 2021, which claims the priority of Chinese Patent Application No. 202011290395.5, titled "METHOD AND APPARATUS FOR GENERATING PAGE", filed on Nov. 18, 2020. Both of the aforementioned applications are hereby incorporated by reference in their entireties.

TECHNICAL FIELD

Embodiments of the present disclosure relate to the field of computer technology, in particular to the field of network technology, and more particularly, to a method and apparatus for generating a page.

BACKGROUND

At present, mobile devices are used more and more widely in people's daily lives. However, for some special human groups (such as patients with color blindness or color weakness), they may have recognition barriers when using applications installed on the mobile devices.

In related technologies, a barrier-free design for the special human groups usually includes the following forms: using some specific applications to provide barrier-free color matching modes for special groups, in which exclusive color matching schemes may be used; using some applications in which different colors are graphically identified; and using some applications with built-in image-to-voice function modules to provide color information to users by voice.

SUMMARY

Embodiments of the present disclosure propose a method and apparatus for generating a page.

Some embodiments of the present disclosure provides a method for generating a page, the method including: acquiring initial color information and size information of a target element in a window of an initial page; generating simulated color information of the target element using a first color transformation strategy, based on the initial color information, color indicated in the simulated color information representing a visual effect of an initial color of the target element in eyes of a characteristic population; generating, in response to determining that the simulated color information of the target element satisfies a preset condition, target color information of the target element using a second color transformation strategy, based on the initial color information of the target element, the prese condition representing a degree of friendliness of the simulated color to the characteristic population; and redrawing the target element based on the target color information and the size information to obtain a target page.

In some embodiments, the target element is determined through following steps: using an intersection observe API to asynchronously acquire intersection states of elements in the initial page with the window of the initial page; and determining, in response to determining that an intersection ratio of an element in the initial page to the window of the initial page reaches a preset intersection threshold, the element as the target element.

In some embodiments, the method further comprises: using the intersection observe API to asynchronously acquire the simulated color information of target elements in the initial page, and performing following steps on each target element: comparing the simulated color information of the target element with a preset color interval, to determine whether the simulated color information is in the color range to obtain a first comparison result; based on the simulated color information of the target element and the simulated color information of an adjacent target element, determining a difference between the simulated color information of the target element in a contiguous area of the target element and the adjacent target element and simulated color information of the adjacent target element in the contiguous area, and comparing the difference with a preset color difference threshold to determine whether the difference is less than the color difference threshold, to obtain a second comparison result, wherein the adjacent target element is another target element that is adjacent to a boundary of the target element in the initial page; determining, in response to the target element comprising a plurality of pieces of simulated color information, a difference between each two pieces of simulated color information of the target element, and comparing the difference with the color difference threshold to determine whether the difference is less than the color difference threshold, to obtain a third comparison result; and determining, in response to determining that not all of the first comparison result, the second comparison result and the third comparison result of the target element are NO, that the target element satisfies the preset condition.

In some embodiments, the initial color information and the size information of the target element are acquired through following steps: using the intersection observe API to asynchronously acquire a text object model of the initial page; extracting a cascading style sheet of the target element from the text object model; and extracting the initial color information and the size information of the target element from the cascading style sheet; the simulated color information of the target element is acquired through a following step: adjusting the initial color information according to the first color transformation strategy using the intersection observe API, to obtain the simulated color information; the target color information of the target element is generated through a following step: adjusting the initial color information according to the second color transformation strategy using the intersection observe API, to obtain the target color information; and redrawing the target element based on the target color information and the size information, comprises: updating a color style of the target element using the text object model, based on the target color information and the size information of the target element, to obtain a redrawn target element.

In some embodiments, the target color information of the target element is generated through following steps: determining initial values of color components R (red), G (green), B (blue), based on the initial color information of the target element; and updating a target value of a color component R to an initial value of a color component G, updating a target value of the color component G to an initial value of a color component B, updating a target value of the color component B to an initial value of the color component R, to obtain the target color information of the target element.

Some embodiments of the present disclosure provide an apparatus for generating a page, the apparatus comprising: an information acquisition unit, configured to acquire initial color information and size information of a target element in a window of an initial page; a color simulation unit, configured to generate simulated color information of the target element using a first color transformation strategy, based on the initial color information, color indicated in the simulated color information representing a visual effect of an initial color of the target element in eyes of a characteristic population; a color optimization unit, configured to generate, in response to determining that the simulated color information of the target element satisfies a preset condition, target color information of the target element using a second color transformation strategy, based on the initial color information of the target element, the prese condition representing a degree of friendliness of the simulated color to the characteristic population; and a page updating unit, configured to redraw the target element based on the target color information and the size information to obtain a target page.

In some embodiments, the apparatus further comprises a target element determining unit, configured to: the apparatus further comprises a target element determining unit, configured to: use an intersection observe API to asynchronously acquire intersection states of elements in the initial page with the window of the initial page; and determine, in response to determining that an intersection ratio of an element in the initial page to the window of the initial page reaches a preset intersection threshold, the element as the target element.

In some embodiments, the apparatus further comprises a color comparing unit, configured to: use the intersection observe API to asynchronously acquire the simulated color information of target elements in the initial page, and performing following steps on each target element: comparing the simulated color information of the target element with a preset color interval, to determine whether the simulated color information is in the color range to obtain a first comparison result; based on the simulated color information of the target element and the simulated color information of an adjacent target element, determining a difference between the simulated color information of the target element in a contiguous area of the target element and the adjacent target element and simulated color information of the adjacent target element in the contiguous area, and comparing the difference with a preset color difference threshold to determine whether the difference is less than the color difference threshold, to obtain a second comparison result, wherein the adjacent target element is another target element that is adjacent to a boundary of the target element in the initial page; determining, in response to the target element comprising a plurality of pieces of simulated color information, a difference between each two pieces of simulated color information of the target element, and comparing the difference with the color difference threshold to determine whether the difference is less than the color difference threshold, to obtain a third comparison result; and determining, in response to determining that not all of the first comparison result, the second comparison result and the third comparison result of the target element are NO, that the target element satisfies the preset condition.

In some embodiments, the information acquisition unit is further configured to: use the intersection observe APT to asynchronously acquire a text object model of the initial page; extract a cascading style sheet of the target element from the text object model; and extract the initial color information and the size information of the target element from the cascading style sheet; the color simulation unit is further configured to: adjust the initial color information according to the first color transformation strategy using the intersection observe API, to obtain the simulated color information; the color optimization unit is further configured to: adjust the initial color information according to the second color transformation strategy using the intersection observe API, to obtain the target color information; and the page updating unit is further configured to: update a color style of the target element using the text object model, based on the target color information and the size information of the target element, to obtain a redrawn target element.

In some embodiments, the color optimization unit further comprises: an initial color component acquisition module, configured to determine initial values of color components R (red), G (green), B (blue), based on the initial color information of the target element; and a color component optimization module, configured to update a target value of a color component R to an initial value of a color component G, update a target value of the color component G to an initial value of a color component B, update a target value of the color component B to an initial value of the color component R, to obtain the target color information of the target element.

BRIEF DESCRIPTION OF THE DRAWINGS

Other features, objectives, and advantages of the present disclosure will become more apparent from the following detailed description of the non-limiting embodiments with reference to the accompanying drawings.

DETAILED DESCRIPTION OF EMBODIMENTS

The present disclosure will, be further described in detail below with reference to the accompanying drawings and embodiments. It may be understood that the embodiments described herein are only used to explain the relevant disclosure, but not to limit the disclosure. In addition, it should be noted that, for ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
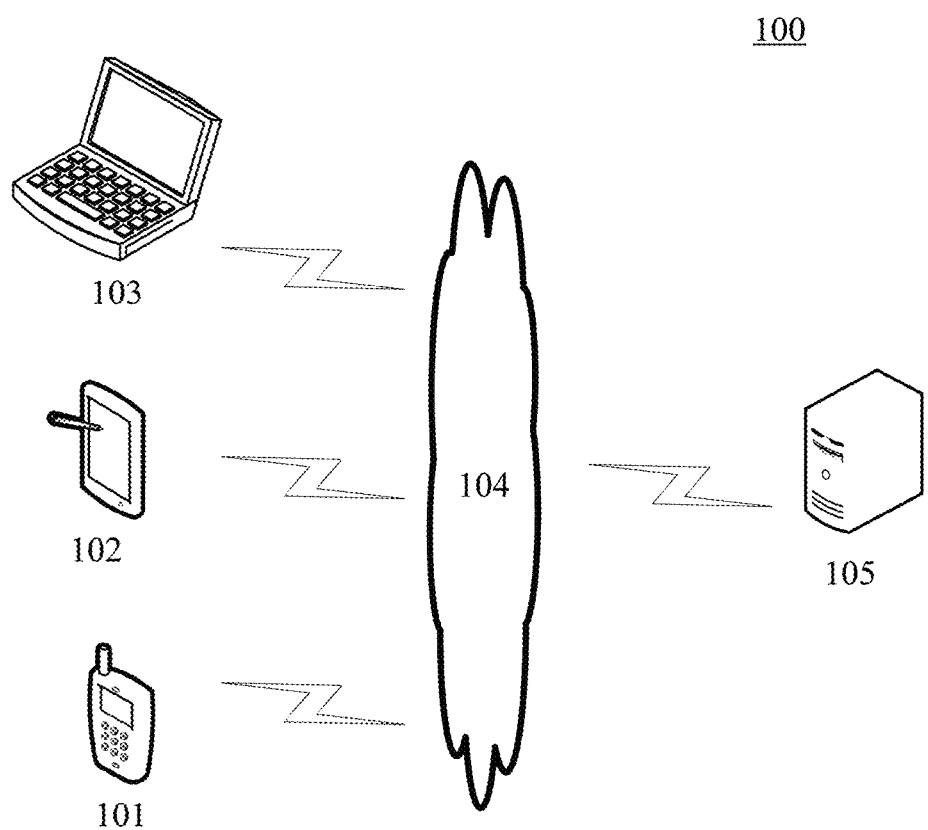
FIG. 1 is an exemplary system architecture diagram to which some embodiments of the present disclosure may be applied.

FIG. 1 shows an exemplary system architecture 100 to which embodiments of a method for generating a page or an apparatus for generating a page of the present disclosure may be applied.

As shown in FIG. 1, the system architecture 100 may include terminal devices 101, 102, and 103, a network 104, and a server 105. The network 104 serves as a medium providing a communication link between the terminal devices 101, 102, 103, and the server 105. The network 104 may include various types of connections, such as wired or wireless communication links, or optical cables.

The terminal devices 101, 102, 103 are installed with various browser applications, such as shopping applications, website client applications, stock applications. With the browser applications, users may use the terminal devices 101, 102, 103 to interact with the server 105 via the network 104 to receive or send messages, etc. Fox example, users may enter URLs they want to access in the browser applications, the terminal devices send access requests to the server 105 and receives HTML (Hyper Text Markup Language) documents sent by the server, then the browser applications installed on the terminal devices parse and render the HTML documents and present them as web pages on displays of the terminal devices. Before presenting the web pages to the users, the terminal devices may first acquire initial color information and size information of each target element in initial pages of the web pages, then optimize and redraw colors of target elements that satisfy a preset condition, and present obtained target pages to the users.

The terminal devices 101, 102, 103 may be hardware or software. When the terminal devices 101, 102, 103 are hardware, they may be electronic devices having communication functions, including but not limited to smartphones, tablet computers, e-book readers and laptop computers, etc. When the terminal devices 101, 102, 103 are software, they may be installed in the above-listed electronic devices. They may be implemented as, for example, a plurality of software or software modules used to provide distributed services, or as a single software or software module, which is not limited herein.

The server 105 may be a server that provides various services, such as a backend web server that receives web page access requests sent by the terminal devices 101, 102, 103 and re-urns HTML documents indicated by the web page access requests to the terminal devices. The server may be hardware or software. When the server is hardware, it may be implemented as a distributed server cluster composed of multiple servers, or as a single server. When the server is software, it may be implemented as, for example, a plurality of software or software modules used to provide distributed services, or as a single software or software module, which is not limited herein.

It should be noted that the method for generating a page provided by embodiments of the present disclosure may be performed by the terminal devices 101, 102, 103, correspondingly, the apparatus for generating a page may be provided in the terminal devices 101, 1.02, 103.

Figure 2:
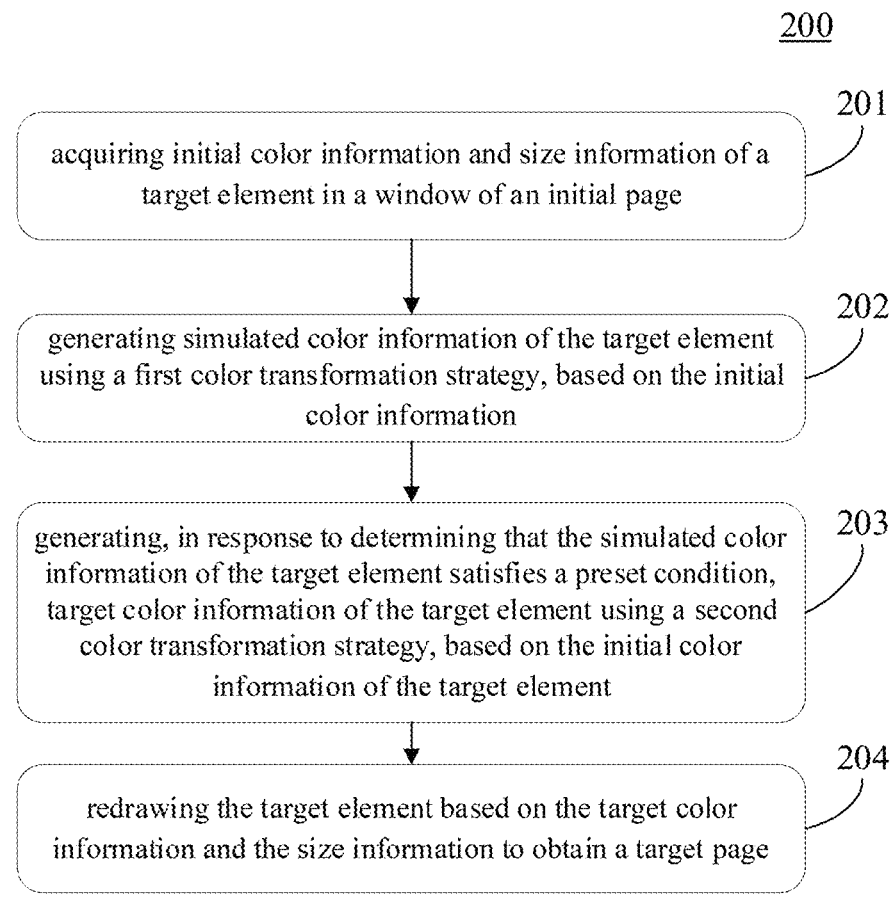
FIG. 2 is a flowchart of an embodiment of a method for generating a page according to the present disclosure.

With further reference to FIG. 2, illustrating a flow 200 of an embodiment of a method for generating a page. The method for generating a page includes the following steps 201 to 204.

Step 201, acquiring initial color information and size information of a target element in a window of an initial page.

In the present embodiment, an electronic device (e.g., the terminal device in FIG. 1) on which the method for generating a page runs is installed with a variety of browser applications, a window size applied by each browser application is generally larger than or equal to a screen size of the electronic device, elements in the window are page content presented by the browser to a user, and the target element in the present embodiment is a text or a picture in the window. Typically, each of the elements in the page is composed of a plurality of box models of different sizes. Therefore, the initial color information of the target element in the present embodiment includes initial color information of each box constituting the target element, and accordingly, the size information refers to size information of each box constituting the target element. For example, the size information may be a length and width of each box.

As an example, the target element may be a text and a block where the text is located, and the initial color information of the target element includes an initial color of the text and an initial color of the block where the text is located (i.e., a background color of the text). For example, color may be represented in the form of R (red), G (green), B (blue) components. The size information of the target element includes size information of the text and size information of the block where the text is located. For example, a length and width of the text and the block may be represented in a form of pixel number.

In a specific example, the electronic device on which the method for generating a page runs may directly acquire a cascading style sheet (CSS) of each target element in the window from a HTML document of the current page, and then extract the initial color information (such as values of the RGB color components) and the size information of each box that constitutes each target element from the CSS of each target element, to obtain the initial color information and the size information of each target element.

In some alternative implementations of the present embodiment, the method for generating a page may further include: using an intersection observe API to asynchronously acquire an intersection state of an element in the initial page and the window of the initial page; and determining, in response to determining that an intersection ratio of the element in the initial page to the window of the initial page reaches a preset intersection threshold, the element as the target element.

In this implementation, the electronic device may continuously acquire the intersection state of each element in the initial page and the window by using an intersection observe model, and play a role of monitoring the initial page, so that the target element may be determined in time and a response sensitivity may be improved.

Step 202, generating simulated color information of the target element using a first color transformation strategy, based on the initial color information, a color indicated in the simulated color information representing a visual effect of an initial color of the target element in eyes of a characteristic population.

In the present embodiment, the first color transformation strategy is used to represent a corresponding relationship between the initial color and the simulated color, for example, it may be a color blindness simulation matrix. Typically, the color blindness simulation matrix may include three types of simulation matrices: red blindness, green blindness and blue blindness. The color blindness simulation matrix is a result of medical research and is common knowledge in the field, detailed description of which will be omitted in the present disclosure.

The electronic device may construct an initial color vector of each box based on values of initial RGB components of each box in the target element, and the initial color information of the target element is a set of the initial color vectors of the boxes. Then, the electronic device may premultiply each initial color vector by the three types of color blindness simulation matrices respectively to obtain three simulated color vectors corresponding to each box, and each simulation color vector represents a visual effect of the initial color of the box in the eyes of patients with a corresponding type of color blindness. The simulated color information of the target element is a set of the simulated color vectors of the boxes.

Step 203, generating, in response to determining that the simulated color information of the target element satisfies a preset condition, target color information of the target element, using a second color transformation strategy, based on the initial color information of the target element, the present condition representing a degree of friendliness of the simulated color to the characteristic population.

In the present embodiment, the simulated color that satisfies the preset condition indicates that the initial color corresponding to the simulated color is less friendly to the characteristic population. The second color transformation strategy is used to represent a corresponding relationship between the initial color and the target color, and the target color represents a color that is easily recognized to the characteristic population. For example, the second color transformation strategy may be an adaptive mapping method or a geometric transformation mapping method.

In the present embodiment, the degree of friendliness of the target element to the characteristic population may be represented by a degree of difference of the simulated color of each box in the target element. For example, a difference degree of colors may be represented by color difference, and then a color difference threshold may be preset based on a result of statistical analysis, so that the preset condition is that the color difference of the simulated colors between two adjacent boxes is less than the color difference threshold.

As an example, the electronic device may extract the simulated color vector of each box from the simulated color information of the target element obtained in step 202, then determine the color difference between two adjacent boxes, and then compare each color difference with the color difference threshold respectively. If a color difference is less than the color difference threshold, it indicates that the initial colors of the two adjacent boxes corresponding to the color difference is less friendly to the characteristic population. For example, according to medical research results, the color difference threshold may be set to 60, and a color difference less than 60 indicates that the characteristic population cannot distinguish between the two colors or have difficulty in distinguishing.

Further, the electronic device may determine the color difference between two adjacent boxes through the following steps: first, converting color information represented by the RGB color components into Lab (Lab color space) color components, and then calculating a distance between the simulated color vectors of the two adjacent boxes in the Lab color space, and determining the distance to be the color difference of the simulated colors between the two adjacent boxes.

In a specific example, a target element includes 3 boxes. According to sizes of the boxes in descending order in sequence are 1, 2 and 3, the initial color information of the target element is (a, b, c), where a, b, c are the initial RGB color vectors of the boxes 1, 2, 3, respectively. First, the electronic device pre-multiplies a, b, c by the three types of color blindness simulation matrices respectively, the obtained simulated color information of the target element includes the following three types of simulated color information: red blindness simulated color information $(a_R, k_R, c_R)$, green blindness simulated color information $(a_G, b_G, c_G)$ and blue blindness simulated color information $(a_Z, b_Z, c_Z)$. Then the electronic device converts the above three types of RGB color vectors into Lab color vectors, and calculates the distances of the three types of simulated color vectors between the boxes 1 and 2, 2 and 3 in the Lab color space respectively, to obtain the color differences between the two adjacent boxes in the three types: $R_{12}$ and $R_{23}$, $G_{12}$ and $G_{23}$, $B_{12}$, and $B_{23}$. Then, the electronic device compares the above color difference values with the preset color difference threshold respectively. As long as one of the color difference values is less than the color difference threshold, it indicates that the initial color of the target element is less friendly to some or all of the characteristic population. The electronic device may use the adaptive mapping method or the geometric transformation mapping method to optimize (a, b, c), and a resulting vector set (A, B, C) is the target color information of the target element.

It may be understood that if the simulated color information of the target element does not satisfy the preset conditions, it indicates that the initial color of the target element is more friendly to the characteristic population, and color optimization is not required.

Step 204, redrawing the target element based on the target color information and the size information to obtain a target page.

In the present embodiment, based on the size information of the target element obtained in step 201 and the target color information of the target element obtained in step 203, the electronic device may use JS (JavaScript) to modify the CSS of the target element in the HTML document, update the color information of the target element to the target color information, and keep the size information of the target element unchanged, so that the color of the target element in the initial page may be optimized to a more friendly color to the characteristic population, and page rearrangement may not be triggered.

As an example, the electronic device may also acquire a text object model of the initial page, and then set color attributes of each box of the target element in batches by using the text object model based on the target color information, to achieve the redrawing of the target element.

Figure 3:
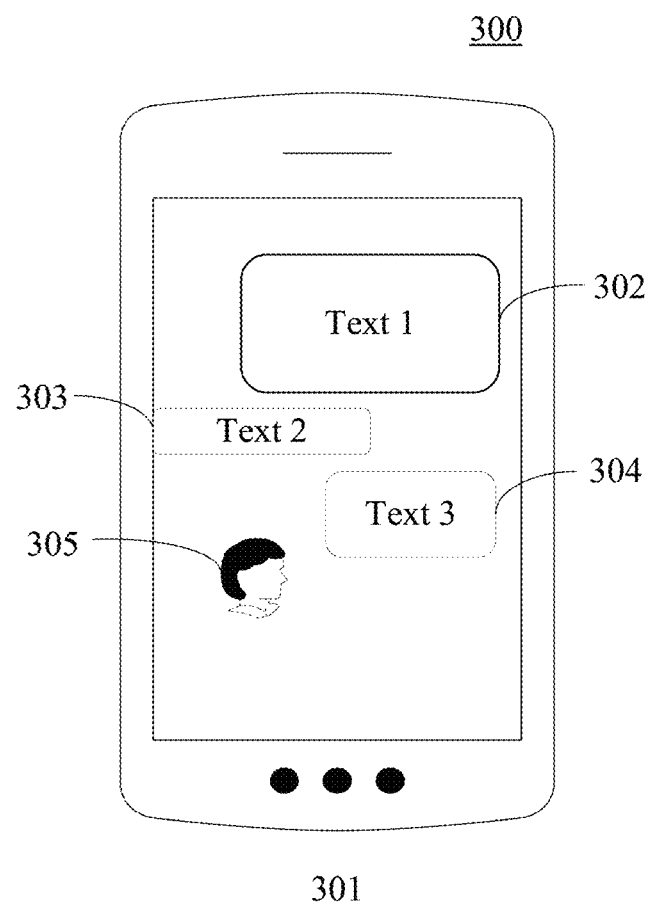
FIGS. 3(a)-(c) are a scenario schematic diagram of the flow of the method for generating a page shown in FIG. 2.
Figure 3:
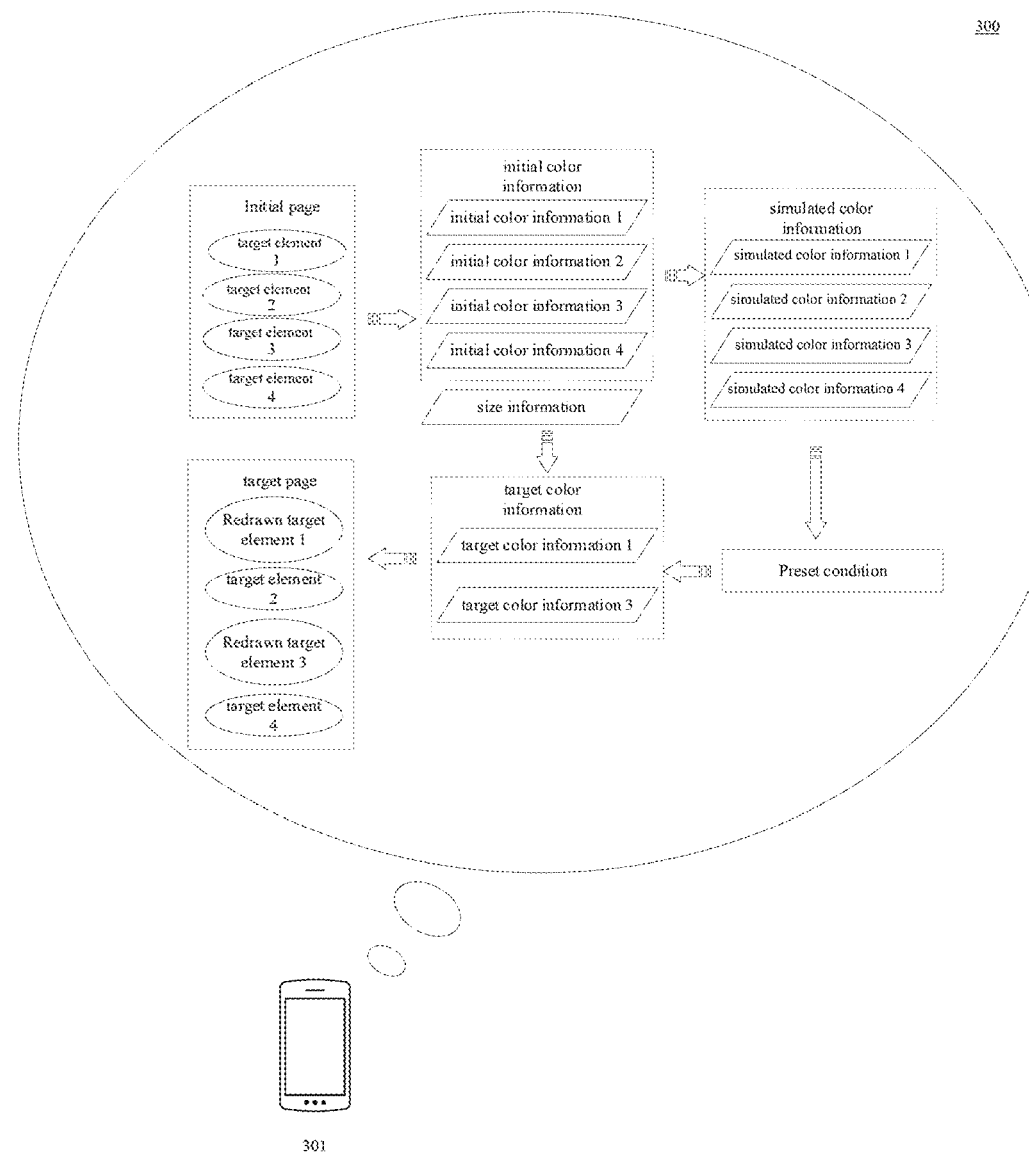
Figure 3:
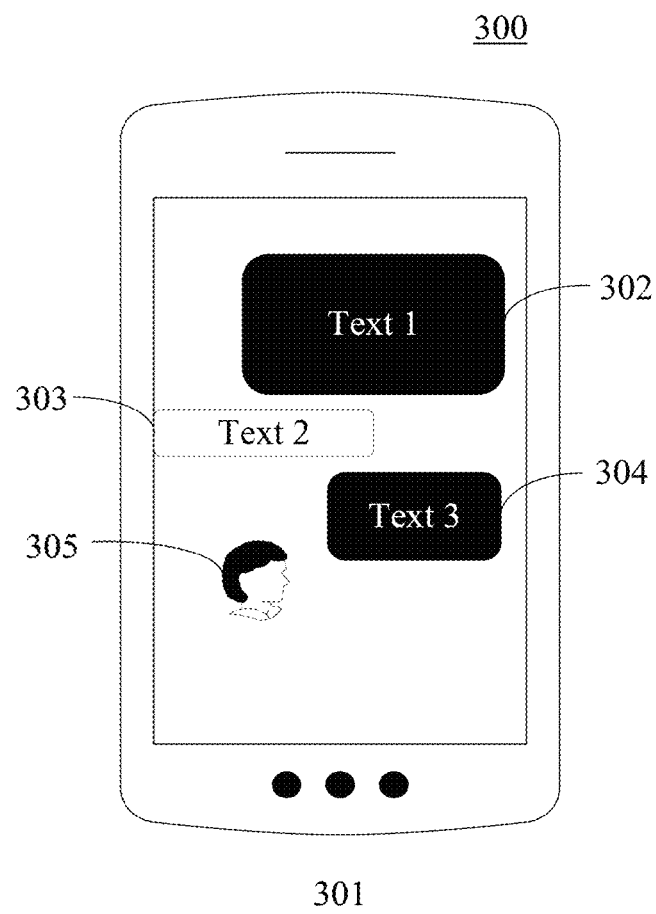

With further reference to FIG. 3, FIG. 3 is another schematic diagram of the flow of the method as shown in FIG. 2. In FIG. 3, an executing body 301 is a smartphone. As shown in FIG. 3 (a), the current page includes 4 target elements: 302, 303, 304 and 305, which are target element 1, target element 2, target element 3 and target element 4, respectively, where 302, 303 and 304 are text elements, 305 is an image element, and each text element consists of two boxes, a text and a block. Next, referring to FIG. 3 (b), the executing body extracts the initial color information and the size information of the above 4 target elements from the initial page (using 302 as an example, the initial color information of text 1 includes initial color information of the text and initial color information of the text block), and generates the simulated color information of each target element respectively using the first color transformation strategy. Then, the executing body compares the simulated color information of each target element with the preset condition, and determines that the initial colors of target element 1 and target element 3 are less friendly to the characteristic population. Next, the executing body generates the target color information of target element 1 and target element 3 using the second color transformation strategy, and redraws target element 1 and target element 3 based on the size information and the target color information. Then, a finally obtained target page includes, target element 2, target element 4 and the redrawn target element 1 and the redrawn target element 3. Finally, referring to FIG. 3(c), after optimization, a color of each element in the target page is more friendly to the characteristic population and may not cause recognition barriers to the characteristic population.

In the method and apparatus for generating a page provided by embodiments of the present disclosure, initial color information and size information of a target element in a window of an initial page is acquire, and simulated color information is generate based on the initial color information, a degree of friendliness of the initial color of the target element to a characteristic population (patients with color blindness or color weakness) is determined by comparing the simulated color information with a preset condition, target color information is generated based on the initial color information of the target element, if the simulated color information satisfies the preset condition, and the target element is redrawn based on the target color information and the size information to obtain an optimized target page. The color of the target element in the page presented by a browser application may be automatically redrawn. On the one hand, it may reduce the difficulty in recognition by the characteristic population for each element in the page; on the other hand, it may reduce color usage limits for a designer during an application development phase.

In some alternative implementations of the present embodiment, the method for generating a page further includes: using the intersection observe API to asynchronously acquire the simulated color information of each target element in the initial page, and performing following steps on each target element: comparing the simulated color information of the target element with a preset color interval, to de-ermine whether the simulated color information is in the color range to obtain a first comparison result; determining, based on the simulated color information of the target element and the simulated color information of an adjacent target element, a difference between the simulated color information of the target element in a contiguous area, of the target element and the adjacent target element, and simulated color information of the adjacent target element in the contiguous area, and comparing the difference with a preset color difference threshold to determine whether the difference is less than the color difference threshold, to obtain a second comparison result, where the adjacent target element is another target element in the initial page that is adjacent to a boundary of the target element; determining, in response to the target element including a plurality of pieces of simulated color information, a difference between each two pieces of simulated color information of the target element, and comparing the difference with the color difference threshold to determine whether the difference is less than the color difference threshold, to obtain a third comparison result; and determining, in response to determining that not all of the first comparison result, the second comparison result and the third comparison result of the target element are "no", that the target element satisfies the preset condition.

In this implementation, the first comparison result represents whether the initial color of the target element is a color that is not easily recognized to the characteristic population, such as red and green lines that represent trends of stock in stock applications. As an example, a color interval may be preset based on a color recognition difficulty for colorblind patients. For example, a RGB value of reed is (255,0,0)), all colors between (240,0,0) and (255,0,0) are very similar to red, thus (240,0,0) to (255,0,0) may be determined as part of the color interval, then the rest of the color interval may be determined based on green and blue. Then a complete color interval may be obtained. Colors in this color interval indicate less friendliness to the characteristic population.

The second comparison result represents whether the degree of color difference between two adjacent target elements is easy for the characteristic population to recognize. For example, for two picture elements with boundaries being joint, it is difficult for the characteristic population to recognize the two pictures if red and green are used at the boundaries of the two pictures.

The third comparison result represents whether the degree of difference between a plurality of colors of the same target element is easy for the characteristic population to recognize. For example, in some ticketing applications, different colors are used for the same seat picture to represent whether the seat is selected or not.

In this implementation, the electronic device may use the intersection observe API to acquire the simulated color information of each target element generated in step 202 and determine whether the target element satisfies the preset condition through the above steps, so that a target element in the initial page that is not friendly enough to the characteristic population may be more accurately determined.

In some alternative implementations of the present embodiment, the target color information may also be generated using the following steps: determining initial values of color components R (red), G (green), B (blue), based on the initial color information of the target element; and updating a target value of the color component R to an initial value of the color component G, updating a target value of the color component G to an initial value of the color component B, updating a target value of the color component B to an initial value of the color component R, to obtain the target color information of the target element.

In various methods that can implement color transformation, the adaptive mapping method only adjusts the B component in the RGB components, and in a final adjustment effect, many image color details may be missing; the geometric transform mapping method compresses the G component in the RGB components, which can keep more color details but the processing is more time-consuming.

The second color transformation strategy used in this implementation may accomplish the transformation from the initial color information to the target color information of the target element by exchanging the values of the color components, which may simplify the process of color optimization and improve an efficiency of color optimization.

As an example, the initial color information of a certain target element includes two Initial color vectors: (255, 100, 150) and (80, 255, 200). Using this implementation, the target color information of this target element may be directly obtained as: (100, 150, 255) and (255, 200, 80).

Figure 4:
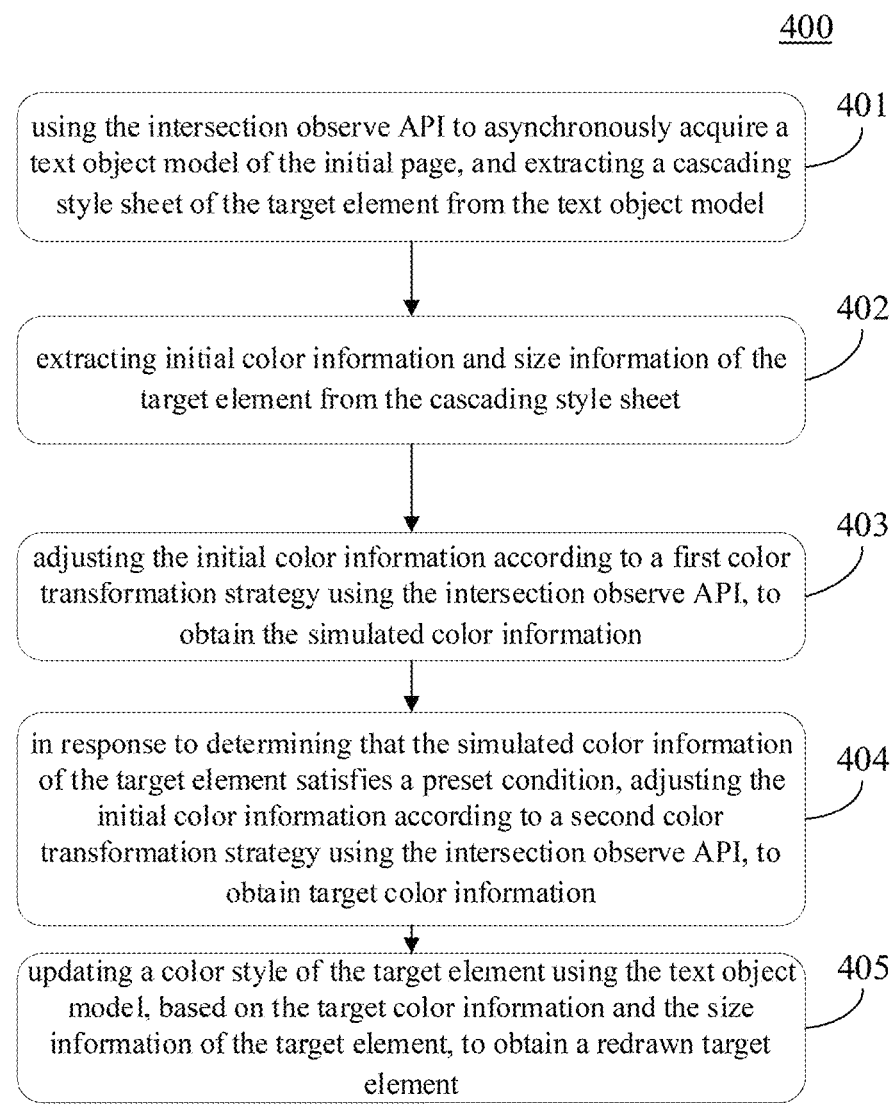
FIG. 4 is a flowchart of another embodiment of the method for generating a page according to the present disclosure.

With further reference to FIG. 4, FIG. 4 illustrates a flow 400 of another embodiment of the method for generating a page. The flow 400 of the method for generating a page includes the following steps 401 to 405.

Step 401, using the intersection observe API to asynchronously acquire a text object model of the initial page, and extracting a cascading style sheet of the target element from the text object model.

In the present embodiment, an electronic device (e.g., the terminal device in FIG. 1) on which the method for generating a page runs may acquire the text object model of the initial page using the intersection observe API. Elements in the initial page correspond to nodes of the text object model in one-to-one correspondence, and each node includes various attribute information of the element. After acquiring the text object model of the initial page using the intersection observe API, the electronic device may perform steps 402 to 404 in a RAM of a browser that generated the initial page.

Step 402, extracting initial color information and size information of the target element from the cascading style sheet.

Step 403, adjusting the initial color information according to a first color transformation strategy using the intersection observe API, to obtain the simulated color information.

Step 404, in response to determining that the simulated color information of the target element satisfies a preset condition, adjusting the initial color information according to a second color transformation strategy using the intersection observe API, to obtain target color information.

It should be noted that steps 403 and 404 correspond to the foregoing steps 203 and 204 respectively, and the difference is that the electronic device in the present embodiment uses the intersection observe API to asynchronously perform color simulation transformation and color optimization steps, detailed description of which will be omitted herein.

Step 405, updating a color style of the target element using the text object model, based on the target color information and the size information of the target element, to obtain a redrawn target element.

In the present embodiment, the electronic device may set the color styles of the target elements in batches using the text object model obtained in step 401, to redraw the target element based on the target color information.

As can be seen in FIG. 4, the flow 400 of the method for generating a page in the present embodiment highlights the steps of, by using the intersection observe API, asynchronously acquiring the initial color information and the size information of the target element, generating the simulated color information and the target color information, and redrawing the target element using the text object model, so that the color optimization step of the target element may be done in the RAM of the browser, avoiding occupying the RAM of the page, which may improve a page generation speed and avoid a page lag caused by color optimization.

It should be noted that the above methods in comparing of a preset condition and generating a target color may also be applied to the embodiment shown in FIG. 4.

Figure 5:
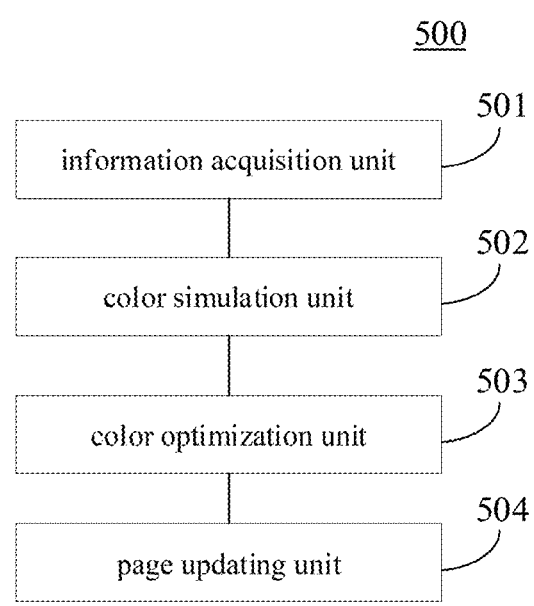
FIG. 5 is a schematic structural diagram of an embodiment of an apparatus for generating a page according to the present disclosure.

With further reference to FIG. 5, as an implementation of the method shown in the above Figures, the present disclosure provides an embodiment of an apparatus for generating a page. The embodiment of the apparatus corresponds to the embodiment of the method shown in FIG. 2. The apparatus may be applied to various electronic devices.

As shown in FIG. 5, the apparatus 500 for generating a page in the present embodiment includes: an information acquisition unit 501, configured to acquire initial color information and size information of a target element in a window of an initial page; a color simulation unit 502, configured to generate simulated color information of the target element using a first color transformation strategy, based on the initial color information, color indicated in the simulated color information representing a visual effect of an initial color of the target element in eyes of a characteristic population; a color optimization unit 503, configured to generate, in response to determining that the simulated color information of the target element satisfies a preset condition, target color information of the target element using a second color transformation strategy, based on the initial color information of the target element, the present condition representing a degree of friendliness of the simulated color to the characteristic population; and a page updating unit 504, configured to redraw the target element based on the target color information and the size information to obtain a target page.

In some embodiments, the apparatus 500 further includes a target element determining unit, configured to: use an intersection observe API to asynchronously acquire intersection states of elements in the initial page with the window of the initial page; and determine, in response to determining that an intersection ratio of an element in the initial page to the window of the initial page reaches a preset intersection threshold, the element as the target element.

In some embodiments, the apparatus 500 further includes a color comparing unit, configured to: use the intersection observe API to asynchronously acquire the simulated color information of target elements in the initial page, and performing following steps on each target element: comparing the simulated color information of the target element with a preset color interval, to determine whether the simulated color information is in the color range to obtain a first comparison result; based on the simulated color information of the target element and the simulated color information of an adjacent target element, determining a difference between the simulated color information of the target element in a contiguous area of the target element and the adjacent target element and simulated color information of the adjacent target element in the contiguous area, and comparing the difference with a preset color difference threshold to determine whether the difference is less than the color difference threshold, to obtain a second comparison result, wherein the adjacent target element is another target element that is adjacent to a boundary of the target element in the initial page; determining, in response to the target element comprising a plurality of pieces of simulated color information, a difference between each two pieces of simulated color information of the target element, and comparing the difference with the color difference threshold to determine whether the difference is less than the color difference threshold, to obtain a third comparison result; and determining, in response to determining that not all of the first comparison result, the second comparison result and the third comparison result of the target element are NO, that the target element satisfies the preset condition.

In some embodiments, the information acquisition unit 501 is further configured to: use the intersection observe API to asynchronously acquire a text object model of the initial page; extract a cascading style sheet of the target element from the text object model; and extract the initial color information and the size information of the target element from the cascading style sheet; the color simulation unit is further configured to: adjust the initial color information according to the first color transformation strategy using the intersection observe API, to obtain the simulated color information; the color optimization unit is further configured to: adjust the initial color information according to the second color transformation strategy using the intersection observe API, to obtain the target color information; and the page updating unit is further configured to: update a color style of the target element using the text object model, based on the target color information and the size information of the target element, to obtain a redrawn target element.

In some embodiments, the color optimization unit 503 further includes: an initial color component acquisition module, configured to determine initial values of color components R (red), G (green), B (blue), based on the initial color information of the target element; and a color component optimization module, configured to update a target value of a color component R to an initial value of a color component G, update a target value of the color component G to an initial value of a color component B, update a target value of the color component. B to an initial value of the color component R, to obtain the target color information of the target element.

Figure 6:
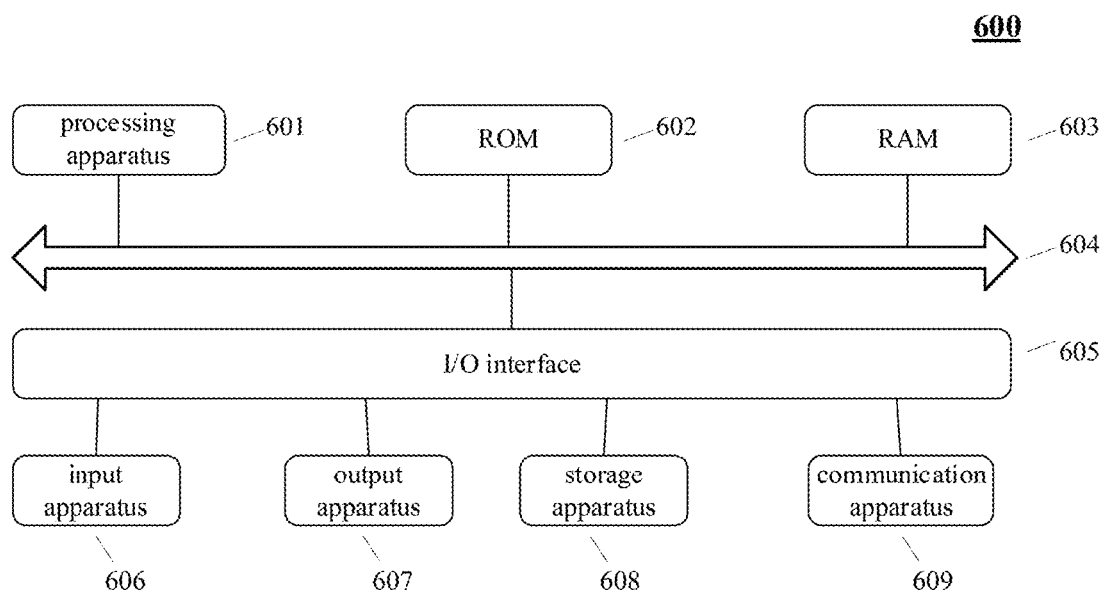
FIG. 6 is a schematic structural diagram of an electronic device suitable for implementing embodiments of the present disclosure.

With further reference to FIG. 6, a schematic structural diagram of an electronic device 600 (for example, the server or terminal device in FIG. 1) suitable for implementing embodiments of the present disclosure is shown. The terminal device in embodiments of the present disclosure may include, but are not limited to, mobile terminals such as cell phones, laptop computers, digital broadcast receivers, PDAs (personal digital assistants), or PADs (tablet computers), and fixed terminals such as digital TVs, or desktop computers. The terminal device shown in FIG. 6 is merely an example, and should not impose any limitation on the function and scope of use of the embodiments of the present disclosure.

As shown in FIG. 6, the electronic device 600 may include a processing apparatus (such as a central processing unit, a graphics processor) 601, which may execute various appropriate actions and processes in accordance with a program stored in a read-only memory (ROM) 602 or a program loaded into a random access memory (RAM) 603 from a storage apparatus 608. The RAM 60.3 also stores various programs and data required by operations of the electronic device 600. The processing apparatus 601, the ROM 602 and the RAM 603 are connected to each other through a bus 604. An input/output (I/O) interface 605 is also connected to the bus 604.

Typically, the following apparatuses may be connected to the I/O interface 605: an input apparatus 606 including a touch screen, a touch pad, a keyboard, a mouse, a camera, a microphone, an accelerometer, or a gyroscope; an output apparatus 607 including such as a liquid crystal display (LCD), a speaker, or a vibrator; the storage apparatus 608 including such as a magnetic tape, or a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood, however, that not all shown apparatuses are required to be implemented or provided. More or fewer apparatuses may alternatively be implemented or provided. Each block shown in FIG. 6 may represent one apparatus, or may represent a plurality of apparatuses as needed.

In particular, according to embodiments of the present disclosure, the processes described above with reference to the flowcharts may be implemented as computer software programs. For example, the embodiments of the present disclosure include a computer program product comprising a computer program carried on a computer readable medium, the computer program containing program codes for performing the method illustrated in the flowcharts. In such embodiments, the computer program may be downloaded and installed from the network via the communication portion 609 and/or installed from the removable medium 611. When the computer program is executed by the processor 601, the above functions defined in the method of the present disclosure are performed. It should be noted that the computer readable medium described by some embodiments of the present disclosure may be computer readable signal medium or computer readable storage medium or any combination of the above two. The computer readable storage medium may be, but is not limited to: an electric, magnetic, optical, electromagnetic, infrared, or semiconductor system, an apparatus, an element, or any combination of the above. A more specific example of the computer readable storage medium may include but is not limited to: an electrical connection with one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by or in combination with an instruction execution system, an apparatus or an element. In some embodiments of the present disclosure, the computer readable signal medium may include a data signal in the base band or propagating as a part of a carrier, in which computer readable program codes are carried. The propagating signal may be various forms, including but not limited to: an electromagnetic signal, an optical signal or any suitable combination of the above. The computer readable signal medium may be any computer readable medium except for the computer readable storage medium. The computer readable signal medium is capable of transmitting, propagating or transferring programs for use by or in combination with an instruction execution system, an apparatus or an element. The program codes contained on the computer readable medium may be transmitted with any suitable medium including but not limited to: a wire, an optical cable, RF (Radio Frequency), or any suitable combination of the above.

The computer readable medium may be included in the electronic device, or a stand-alone computer readable medium not assembled into the electronic device. The computer readable medium carries one or more programs. The one or more programs, when executed by the electronic device, cause the electronic device to: acquire initial color information and size information of a target element in a window of an initial page; generate simulated color information of the target element using a first color transformation strategy, based on the initial color information, a color indicated in the simulated color information representing a visual effect of an initial color of the target element in eyes of a characteristic population; generate, in response to determining that the simulated color information of the target element satisfies a preset condition, target color information of the target element using a second color transformation strategy, based on the initial color information of the target element, the present condition representing a degree of friendliness of the simulated color to the characteristic population; and redraw the target element based on the target color information and the size information to obtain a target page.

A computer program code for executing operations of some embodiments of the present disclosure may be written in one or more programming languages or a combination thereof. The programming languages include object-oriented programming languages, such as Java, Smalltalk or C++, and also include conventional procedural programming languages, such as "C" language or similar programming languages. The program code may be completely executed on a user computer, partially executed on a user computer, executed as a separate software package, partially executed on a user computer and partially executed on a remote computer, or completely executed on a remote computer or server. In a case involving a remote computer, the remote computer may be connected to a user computer through any kind of network, including a local area network (LAN) or a wide area network (WAN), or may be connected to an external computer (for example, connected through Internet using an Internet service provider).

The flowcharts and block diagrams in the accompanying drawings show architectures, functions and operations that may be implemented according to the systems, methods and computer program products of the various embodiments of the present disclosure. In this regard, each of the blocks in the flowcharts or block diagrams may represent a module, a program segment, or a code portion, the module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor including an information acquisition unit, a color simulation unit, a color optimization unit and a page updating unit. Here, the names of these units do not in some cases constitute limitations to such units themselves. For example, the information acquisition unit may also be described as "a unit configured to acquire initial color information and size information of a target element in a window of an initial page".

The above description only provides an explanation of the preferred embodiments of the present disclosure and the technical principles used. It should be appreciated by those skilled in the art that the inventive scope involved in the present disclosure is not limited to the technical solutions formed by the particular combinations of the above technical features. The inventive scope should also cover other technical solutions formed by any combinations of the above technical features or equivalent features thereof without departing from the concept of the present disclosure, such as technical solutions formed through the above features and technical features having similar functions provided (or not provided) in the present disclosure being replaced with each other.

What is claimed is:

1. A method for generating a page, the method comprising:
    acquiring initial color information and size information of a target element in a window of an initial page, wherein the initial color information and the size information of the target element are acquired through following steps: using an intersection observe API to asynchronously acquire a text object model of the initial page; extracting a cascading style sheet of the target element from the text object model; and extracting the initial color information and the size information of the target element from the cascading style sheet;
    generating simulated color information of the target element using a first color transformation strategy, based on the initial color information, color indicated in the simulated color information representing a visual effect of an initial color of the target element in eyes of a characteristic population, wherein the simulated color information of the target element is acquired through a following step: adjusting the initial color information according to the first color transformation strategy using the intersection observe API, to obtain the simulated color information;
    generating, in response to determining that the simulated color information of the target element satisfies a preset condition, target color information of the target element using a second color transformation strategy, based on the initial color information of the target element, the preset condition representing a degree of friendliness of the simulated color to the characteristic population, wherein the target color information of the target element is generated through a following step: adjusting the initial color information according to the second color transformation strategy using the intersection observe API, to obtain the target color information; and
    redrawing the target element based on the target color information and the size information to obtain a target page, wherein the redrawing the target element based on the target color information and the size information, comprises: updating a color style of the target element using the text object model, based on the target color information and the size information of the target element, to obtain a redrawn target element.

2. The method according to claim 1, wherein the target element is determined through following steps:
    using an intersection observe API to asynchronously acquire intersection states of elements in the initial page with the window of the initial page; and
    determining, in response to determining that an intersection ratio of an element in the initial page to the window of the initial page reaches a preset intersection threshold, the element as the target element.

3. The method according to claim 2, wherein the method further comprises:
    using the intersection observe API to asynchronously acquire the simulated color information of target elements in the initial page, and performing following steps on each target element:
    comparing the simulated color information of the target element with a preset color interval, to determine whether the simulated color information is in the color range to obtain a first comparison result;
    based on the simulated color information of the target element and the simulated color information of an adjacent target element, determining a difference between the simulated color information of the target element in a contiguous area of the target element and the adjacent target element and simulated color information of the adjacent target element in the contiguous area, and comparing the difference with a preset color difference threshold to determine whether the difference is less than the color difference threshold, to obtain a second comparison result, wherein the adjacent target element is another target element that is adjacent to a boundary of the target element in the initial page;
    determining, in response to the target element comprising a plurality of pieces of simulated color information, a difference between each two pieces of simulated color information of the target element, and comparing the difference with the color difference threshold to determine whether the difference is less than the color difference threshold, to obtain a third comparison result; and determining, in response to determining that not all of the first comparison result, the second comparison result and the third comparison result of the target element are NO, that the target element satisfies the preset condition.

4. The method according to claim 1, wherein the target color information of the target element is further generated through following steps:

determining initial values of color components R (red), G (green), B (blue), based on the initial color information of the target element; and updating a target value of a color component R to an initial value of a color component G, updating a target value of the color component G to an initial value of a color component B, updating a target value of the color component B to an initial value of the color component R, to obtain the target color information of the target element.

5. An apparatus for generating a page, the apparatus comprising:

at least one processor; and a memory storing instructions, wherein the instructions when executed by the at least one processor, cause the at least one processor to perform operations, the operations comprising:

acquiring initial color information and size information of a target element in a window of an initial page, wherein the initial color information and the size information of the target element are acquired through following steps: using an intersection observe API to asynchronously acquire a text object model of the initial page; extracting a cascading style sheet of the target element from the text object model; and extracting the initial color information and the size information of the target element from the cascading style sheet;

generating simulated color information of the target element using a first color transformation strategy, based on the initial color information, color indicated in the simulated color information representing a visual effect of an initial color of the target element in eyes of a characteristic population, wherein the simulated color information of the target element is acquired through a following step: adjusting the initial color information according to the first color transformation strategy using the intersection observe API, to obtain the simulated color information;

generating, in response to determining that the simulated color information of the target element satisfies a preset condition, target color information of the target element using a second color transformation strategy, based on the initial color information of the target element, the preset condition representing a degree of friendliness of the simulated color to the characteristic population, wherein the target color information of the target element is generated through a following step: adjusting the initial color information according to the second color transformation strategy using the intersection observe API, to obtain the target color information; and redrawing the target element based on the target color information and the size information to obtain a target page, wherein the redrawing the target element based on the target color information and the size information, comprises: updating a color style of the target element using the text object model, based on the target color information and the size information of the target element, to obtain a redrawn target element.

6. The apparatus according to claim 5, wherein the operations further comprise:

using an intersection observe API to asynchronously acquire intersection states of elements in the initial page with the window of the initial page; and determining, in response to determining that an intersection ratio of an element in the initial page to the window of the initial page reaches a preset intersection threshold, the element as the target element.

7. The apparatus according to claim 5, wherein the operations further comprise: using an intersection observe API to asynchronously acquire the simulated color information of target elements in the initial page, and performing following steps on each target element:

comparing the simulated color information of the target element with a preset color interval, to determine whether the simulated color information is in the color range to obtain a first comparison result;

based on the simulated color information of the target element and the simulated color information of an adjacent target element, determining a difference between the simulated color information of the target element in a contiguous area of the target element and the adjacent target element and simulated color information of the adjacent target element in the contiguous area, and comparing the difference with a preset color difference threshold to determine whether the difference is less than the color difference threshold, to obtain a second comparison result, wherein the adjacent target element is another target element that is adjacent to a boundary of the target element in the initial page;

determining, in response to the target element comprising a plurality of pieces of simulated color information, a difference between each two pieces of simulated color information of the target element, and comparing the difference with the color difference threshold to determine whether the difference is less than the color difference threshold, to obtain a third comparison result; and determining, in response to determining that not all of the first comparison result, the second comparison result and the third comparison result of the target element are NO, that the target element satisfies the preset condition.

8. The apparatus according to claim 5, wherein the target color information of the target element is further generated through following steps:

determining initial values of color components R (red), G (green), B (blue), based on the initial color information of the target element; and updating a target value of a color component R to an initial value of a color component G, updating a target value of the color component G to an initial value of a color component B, updating a target value of the color component B to an initial value of the color component R, to obtain the target color information of the target element.

9. A non-transitory computer readable medium, storing a computer program thereon, the program, when executed by a processor, implements operations comprising:

acquiring initial color information and size information of a target element in a window of an initial page, wherein the initial color information and the size information of the target element are acquired through following steps:

using an intersection observe API to asynchronously acquire a text object model of the initial page; extracting a cascading style sheet of the target element from the text object model; and extracting the initial color information and the size information of the target element from the cascading style sheet;

generating simulated color information of the target element using a first color transformation strategy, based on the initial color information, color indicated in the simulated color information representing a visual effect of an initial color of the target element in eyes of a characteristic population, wherein the simulated color information of the target element is acquired through a following step: adjusting the initial color information according to the first color transformation strategy using the intersection observe API, to obtain the simulated color information;

generating, in response to determining that the simulated color information of the target element satisfies a preset condition, target color information of the target element using a second color transformation strategy, based on the initial color information of the target element, the preset condition representing a degree of friendliness of the simulated color to the characteristic population, wherein the target color information of the target element is generated through a following step: adjusting the initial color information according to the second color transformation strategy using the intersection observe API, to obtain the target color information; and redrawing the target element based on the target color information and the size information to obtain a target page, wherein the redrawing the target element based on the target color information and the size information, comprises: updating a color style of the target element using the text object model, based on the target color information and the size information of the target element, to obtain a redrawn target element.

10. The non-transitory computer readable medium according to claim 9, wherein the target element is determined through following steps:

using an intersection observe API to asynchronously acquire intersection states of elements in the initial page with the window of the initial page; and determining, in response to determining that an intersection ratio of an element in the initial page to the window of the initial page reaches a preset intersection threshold, the element as the target element.

11. The non-transitory computer readable medium according to claim 9, wherein the operations further comprise:

using the intersection observe API to asynchronously acquire the simulated color information of target elements in the initial page, and performing following steps on each target element:

comparing the simulated color information of the target element with a preset color interval, to determine whether the simulated color information is in the color range to obtain a first comparison result;

based on the simulated color information of the target element and the simulated color information of an adjacent target element, determining a difference between the simulated color information of the target element in a contiguous area of the target element and the adjacent target element and simulated color information of the adjacent target element in the contiguous area, and comparing the difference with a preset color difference threshold to determine whether the difference is less than the color difference threshold, to obtain a second comparison result, wherein the adjacent target element is another target element that is adjacent to a boundary of the target element in the initial page;

determining, in response to the target element comprising a plurality of pieces of simulated color information, a difference between each two pieces of simulated color information of the target element, and comparing the difference with the color difference threshold to determine whether the difference is less than the color difference threshold, to obtain a third comparison result; and determining, in response to determining that not all of the first comparison result, the second comparison result and the third comparison result of the target element are NO, that the target element satisfies the preset condition.

12. The non-transitory computer readable medium according to claim 9, wherein the target color information of the target element is further generated through following steps:

determining initial values of color components R (red), G (green), B (blue), based on the initial color information of the target element; and updating a target value of a color component R to an initial value of a color component G, updating a target value of the color component G to an initial value of a color component B, updating a target value of the color component B to an initial value of the color component R, to obtain the target color information of the target element.

* * * * *